UNITED STATES PATENT OFFICE.

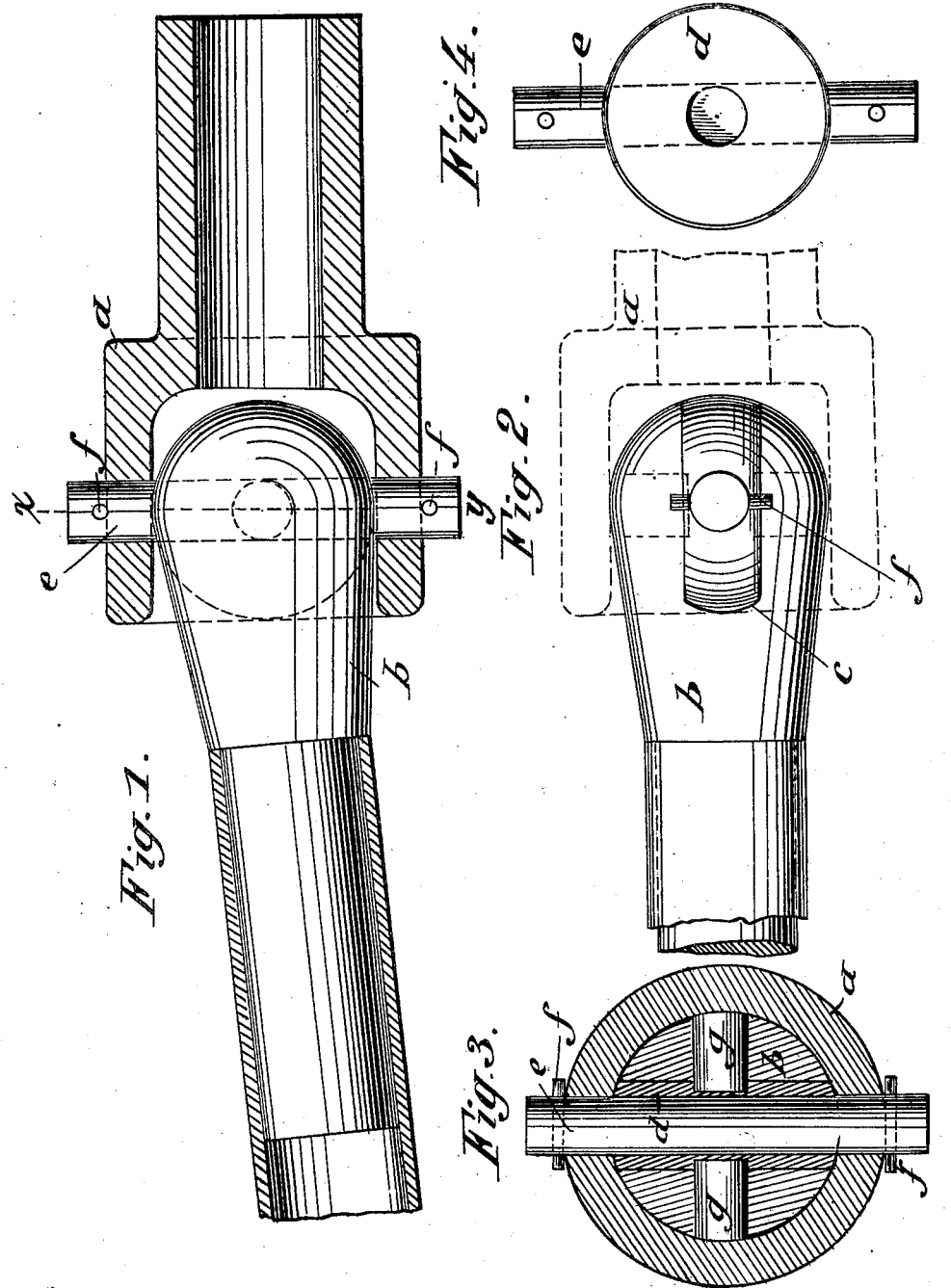

ALEXIS VIVINUS, OF BRUSSELS, BELGIUM.

UNIVERSAL JOINT.

SPECIFICATION forming part of Letters Patent No. 693,577, dated February 18, 1902.

Application filed March 6, 1901. Serial No. 50,093. (No model.)

*To all whom it may concern:*

Be it known that I, ALEXIS VIVINUS, a subject of the King of Belgium, and a resident of Brussels, Belgium, have invented certain new and useful Improvements in Universal Joints, of which the following is a specification.

The object of my present invention is to provide an improved "universal joint" which has the advantage of having a comparatively large friction-surface, so that the strain taken up by the joint is distributed over a large area, whereby deterioration of the engaging parts will be minimized.

In the accompanying drawings, forming a portion of this specification, Figure 1 is a side elevation and partial section of the improved universal joint. Fig. 2 is a top plan view of same. Fig. 3 is a vertical section on line X Y, Fig. 1. Fig. 4 is an elevation of the intermediate swivel.

The universal joint, serving to connect two sections of a shaft, comprises a hollow cylindrical sleeve or socket $a$, preferably made of forged steel and secured to the end of one section and in line with the same. The enlarged end of said hollow socket receives the rounded end or head $b$ of the second shaft-section. Said rounded head is provided with a large and deep groove, in which may rotate the swivel $d$, formed of a spherical segment and rotating on a pivot-pin $e$, extending diametrically through the walls of the socket $a$ and held in place by means of small transverse pins $f$.
It will be understood that the head $b$ is enabled to oscillate on the swivel $d$, friction being produced in this case over the entire flat surface of the swivel. When the oscillations are produced in a plane at right angles with the above oscillations, the friction will be distributed over the entire length of the pivot $e$. The improved construction will therefore reduce the wear and tear of the engaging parts to a minimum.

Longitudinal movements of the head $b$ may be avoided by means of pins $g$, screwed into said head and engaging corresponding recesses provided in the sides of the swivel.

Having fully described my invention, what I claim, and desire to secure by Letters Patent, is—

In a device of the character described, the combination with a hollow cylindrical socket secured to one end of a shaft-section, of a rounded head secured to a second shaft-section, the said head having a slot formed in one end thereof, the walls of said slot being flat, the said slot extending entirely through said head, a spherical segment adapted to operate in said slot, each side of said segment being perfectly flat, the said segment having recesses formed on opposite sides thereof, pins secured in said head on opposite sides thereof for engagement in the said recesses of the segment, the said segment having a recess formed diametrically therethrough, a pivot-pin secured in said recess and to the said socket, and pins secured transversely through each end of said pivot-pin, substantially as described.

In testimony whereof I have hereunto set my hand in presence of two witnesses.

ALEXIS VIVINUS.

Witnesses:
C. SCHER,
GREGORY PHELAN.